(No Model.)
G. R. TYRRELL.
LAWN MOWER.
No. 355,234. Patented Dec. 28, 1886.
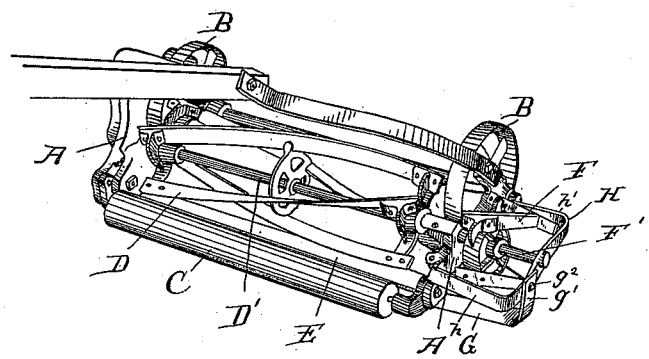
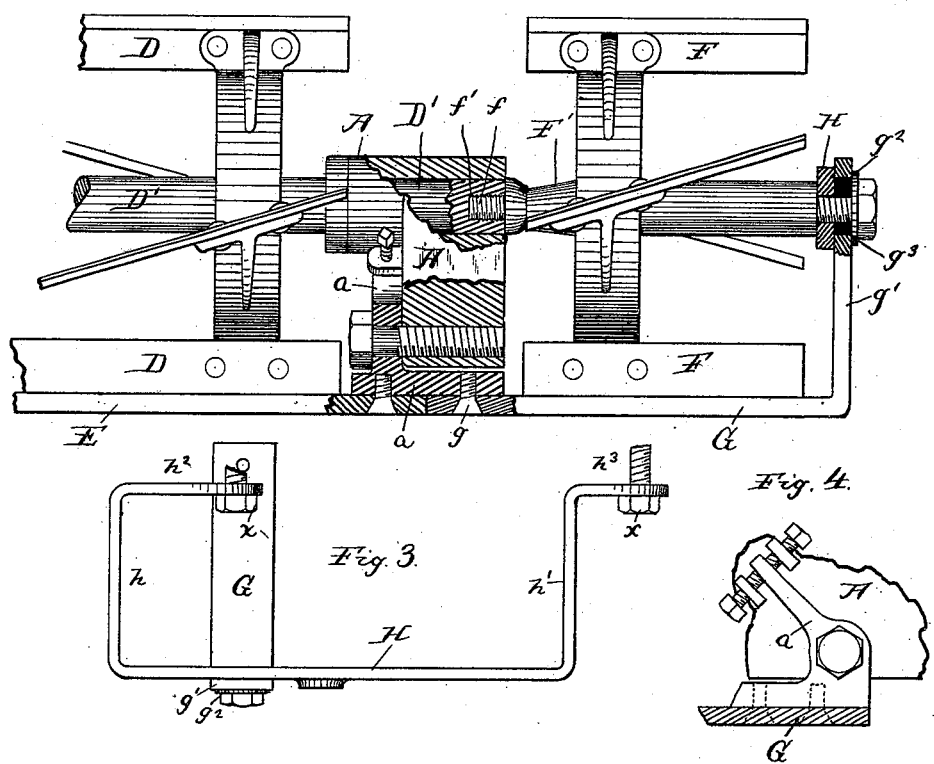
Witnesses:
H. W. Munday.
Edwin Norton
Inventor:
Gilbert R. Tyrrell.
By Munday, Evarts & Adcock,
His Attorneys.

UNITED STATES PATENT OFFICE.

GILBERT R. TYRRELL, OF LA PORTE, INDIANA.

LAWN-MOWER.

SPECIFICATION forming part of Letters Patent No. 355,234, dated December 28, 1886.

Application filed July 31, 1886. Serial No. 209,617. (No model.)

*To all whom it may concern:*

Be it known that I, GILBERT R. TYRRELL, a citizen of the United States, residing in La Porte, in the county of La Porte and State of Indiana, have invented a new and useful Improvement in Lawn-Mowers, of which the following is a specification.

Lawn-mowers as heretofore constructed have consisted, essentially, of a rotary cutter, the shaft of which is journaled at each end in a frame mounted upon a pair of driving-wheels, and which frame carries the opposing stationary cutter. As the rotary cutter revolves between or inside of the driving-wheels and inside its supporting-frame, difficulty has been experienced in mowing the margins of lawns close to walls, trees, walks, flower-beds, &c.

The object of my invention is to provide means whereby an ordinary lawn-mower may be adapted to cut close up to walls, trees, &c.; and to this end it consists, in combination with an ordinary lawn-mower of any suitable construction, of a supplementary rotary cutter, the shaft of which is secured rigidly to the shaft of the rotary cutter of the mower at the end thereof, and a stationary cutter or blade secured to the end of the stationary blade of the mower. By means of this supplementary cutter, projecting as it does at the end of the mower-frame and beyond the driving-wheel, the grass may be mowed close up to a wall or other obstruction. The outer end of a rotary cutter-shaft is supported by and journaled in a metal bracket or arm bolted to the end of the mower-frame. The shaft of the supplementary rotary cutter is preferably secured to the mower-shaft by providing the former with screw-threads which enter a threaded hole in the end of the mower-shaft. The supporting-bracket is also detachably secured to the mower-frame, so that the supplementary cutter may be easily and quickly attached to or detached from the mower when desired.

In the accompanying drawings, which form a part of this specification, and in which similar letters of reference indicate like parts, I have shown my invention as applied to one of the customary kinds or forms of lawn-mowers now upon the market. It will of course be understood, however, that my improvement may be readily applied to other forms or kinds of lawn-mowers.

In said drawings, Figure 1 is a perspective view of a device embodying my invention. Fig. 2 is an enlarged central longitudinal sectional view of the supplementary cutter. Fig. 3 is a detailed plan view of the bracket for the supplementary cutter, showing also the stationary cutter; and Fig. 4 is an enlarged end view showing the adjustable arm or bracket to which the stationary cutters are secured.

In the drawings, A represents the frame of the mower; B, the driving-wheels; C, the rear roller; D, the rotary cutter; D', its shaft, and E the stationary blade or cutter of the mower. All these parts are or may be of any suitable or ordinary construction, and as the construction and operation of the same is well known a particular description is not here necessary.

Motion is communicated to the cutter-shaft D' from the driving-wheel by suitable gearing at one end of the mower. In the drawings this gearing is concealed by the casting or frame-piece at the end of the mower, and is therefore not shown; but its construction and operation are well known, and form no part of my invention.

F is the supplementary rotary cutter, the shaft F' of which is provided with screw-threads $f$ at its inner end, and is screwed into a threaded hole, $f'$, in the end of the mower-shaft D'. In some mowers the cutter-shaft D is already provided with a threaded hole in its end for the purpose of attaching a crank to be used in grinding or sharpening the cutter-blades. In such mowers the threaded end of the supplementary cutter-shaft F' may fit into this same threaded hole.

G is the stationary supplementary cutter blade, and H is the bracket or frame-piece, which is detachably secured to the mower-frame A, and in which the outer end of the shaft F' is journaled, and to which, also, the outer end of the stationary cutter-blade G is secured. The inner end of the cutter-blade G is secured to an adjustable arm or bracket, $a$, on the frame A by a threaded screw-bolt, $g$, at the end of the stationary blade E. The outer end of this cutter-blade G is bent up at right angles, forming an arm, $g'$, which is bolted at $g^2$ to the bracket H.

The bracket H is preferably made in about the form indicated in the drawings, having right-angle bends $h$ and $h'$, forming the two ends of the bracket, and projections or arms $h^2 h^3$, through which the bolts pass by which it is secured to the frame of the mower.

The stationary knife or cutter-blade G is secured at its inner end to the same adjustable bracket or arm $a$ which carries the stationary cutter-blade E. The inner end of the supplementary cutter-blade may be thus adjusted relative to its rotary cutter F by the same means that the stationary blade E is adjusted relative to its rotary cutter D. The outer end of the blade G is adjusted by means of the slotted hole $g^3$ in the bent end of said blade.

The shaft F' of the rotary cutter F being screwed rigidly to the shaft D' of the rotary cutter D, the former is driven by the same means which operate the latter.

The supplementary cutter, it will be observed, may be very easily and quickly detached simply by removing the two nuts $x\ x$ on the two bolts which secure the bracket H to the frame A, and then unscrewing the cutter-shaft F' from the cutter-shaft D' and taking out the screw-bolt at the inner end of the stationary blade G.

In lawn-mowers of that class wherein the shaft or axis of the rotary cutter is located within the circumference of the driving-wheels the shaft of my supplementary cutter cannot of course be connected directly onto the end of such cutter-shaft. In applying my improvement to such mowers the rotary cutter-shaft will be connected by suitable gearing to the cutter-shaft of such mower.

The supplementary cutter may be applied at either end of the mower, or at both ends thereof, if desired. It is preferable, however, to attach the supplementary cutter at that end of the mower which does not carry the driving-gear, as indicated in the drawings.

I claim—

1. In a lawn mower, the combination of the frame, rotary cutter, and stationary cutter-blade of the mower with a supplementary rotary cutter and stationary cutter-blade projecting at the end of the mower and outside the mower-frame, and means for connecting said rotary and stationary cutters of the mower with said supplemetary rotary and stationary cutters, substantially as specified.

2. The combination, in a lawn-mower, of a mower-frame, A, rotary cutter D, stationary cutter-blade E, supplementary rotary cutter F, stationary cutter G, and a supporting-bracket, H, secured to the end of the cutter-frame A, and means for connecting said rotary cutters D and F, substantially as specified.

3. The combination, in a lawn-mower, of frame A, rotary cutter D, shaft D', stationary cutter E, supplementary rotary cutter F, having shaft F', secured to shaft D' at its end, supplementary stationary cutter G, and supporting-bracket H, secured to said frame A at its end, substantially a specified.

4. The combination, in a lawn-mower, of frame A, with rotary cutter D, shaft D', stationary cutter E, supplementary rotary cutter F, having shaft F', screwed by screw-threads to the end of said shaft D', supplementary stationary cutter G, having bent end or arm $g'$, bracket H, having ends $h\ h'$, and side projections, $h^2 h^3$, by which it is secured to the end of said frame A, substantially as specified.

5. A lawn-mower having a frame, a rotary cutter, and stationary cutter mounted within its frame, and provided with a supplementary rotary cutter and stationary cutter projecting at one end outside of the frame and driving-wheels of the mower, and means for connecting said supplementary rotary and stationary cutters with said rotary and stationary cutters of the mower, substantially as specified.

GILBERT R. TYRRELL.

Witnesses:
WM. E. HIGGINS,
MYRON LEROY.